United States Patent
Brown et al.

(10) Patent No.: US 9,287,957 B2
(45) Date of Patent: Mar. 15, 2016

(54) METHOD FOR MULTI-ANTENNA UPLINK TRANSMISSION

(75) Inventors: Tyler Brown, Mundelein, IL (US); Colin Frank, Park Ridge, IL (US); Sandeep Krishnamurthy, Arlington Heights, IL (US); Kenneth Stewart, Grayslake, IL (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1654 days.

(21) Appl. No.: 12/433,270

(22) Filed: Apr. 30, 2009

(65) Prior Publication Data

US 2010/0279621 A1 Nov. 4, 2010

(51) Int. Cl.
*H04B 17/309* (2015.01)
*H04B 7/06* (2006.01)
*H04L 1/00* (2006.01)
*H04B 7/04* (2006.01)

(52) U.S. Cl.
CPC ............ *H04B 7/0628* (2013.01); *H04L 1/0026* (2013.01); *H04L 1/0029* (2013.01); *H04B 7/0413* (2013.01); *H04B 7/0689* (2013.01)

(58) Field of Classification Search
CPC ............... H04B 7/0413; H04B 7/0465; H04B 7/0621–7/0634; H04B 7/0689; H04L 1/0026; H04L 1/0029
USPC ................................... 455/575.7, 63.1, 67.11
See application file for complete search history.

(56) References Cited

U.S. PATENT DOCUMENTS

| 6,754,473 | B1* | 6/2004 | Choi et al. ................... 455/101 |
| 7,499,709 | B2* | 3/2009 | Das et al. ....................... 455/455 |
| 8,054,905 | B2* | 11/2011 | Shnaider et al. .............. 375/267 |
| 8,509,700 | B2 | 8/2013 | Schumacher |
| 8,626,104 | B2* | 1/2014 | Huang et al. .................. 455/310 |
| 2004/0162021 | A1 | 8/2004 | Seki et al. |
| 2005/0026566 | A1* | 2/2005 | Dabak et al. ............... 455/67.11 |

(Continued)

FOREIGN PATENT DOCUMENTS

| CN | 1780173 A | 5/2006 |
| CN | 101039162 A | 9/2007 |

(Continued)

OTHER PUBLICATIONS

Industrial Technology Research Institute; Evaluation of Downlink MIMO Transmission Mode Selection; 3 GPP TSG RAN WG1 Meeting #44-bis; R1-060774; Athens Greece; Mar. 27-31, 2006.

(Continued)

*Primary Examiner* — Patrick O'Neill
(74) *Attorney, Agent, or Firm* — Faegre Baker Daniels LLP (57) ABSTRACT

A method (300) and apparatus (106) for transmitting information based on a relationship between a first channel and a second channel is disclosed. The method can include taking (302) a first channel measurement corresponding to a first antenna of a wireless terminal and taking (304) a second channel measurement corresponding to a second antenna of the wireless terminal. The method can include determining (306) a relationship between the first channel and the second channel based on the first channel measurement and based on the second channel measurement. The method can include transmitting (310) information related to an uplink transmission where the information can be based on the relationship.

14 Claims, 5 Drawing Sheets

(56) References Cited

U.S. PATENT DOCUMENTS

| | | |
|---|---|---|
| 2007/0280360 A1 | 12/2007 | Ihm et al. |
| 2008/0064353 A1 | 3/2008 | McBeath et al. |
| 2008/0192856 A1 | 8/2008 | Jongren et al. |
| 2008/0310353 A1 | 12/2008 | Love et al. |
| 2009/0016312 A1 | 1/2009 | Tao et al. |
| 2010/0008445 A1 | 1/2010 | Khan |
| 2010/0039928 A1 | 2/2010 | Noh et al. |
| 2010/0202560 A1 | 8/2010 | Luo et al. |
| 2010/0220801 A1 | 9/2010 | Lee et al. |
| 2010/0238913 A1 | 9/2010 | Xia et al. |
| 2011/0064035 A1 | 3/2011 | Guerreiro et al. |
| 2011/0085618 A1 | 4/2011 | Zhuang et al. |

FOREIGN PATENT DOCUMENTS

| | | |
|---|---|---|
| JP | 2003018053 A | 1/2003 |
| JP | 2004289407 A | 10/2004 |
| JP | 2005236686 A | 9/2005 |
| WO | 02091625 A1 | 11/2002 |
| WO | 2008/116516 A2 | 10/2008 |

OTHER PUBLICATIONS

3rd Generation Partnership Project (3GPP); Technical Specification Group Radio Access Network; Evolved Universal Terrestrial Radio Access (E-UTRA); Physical layer—Measurements (Release 8); Mar. 2009.

Claude Oestges and Bruno Clerckx; MIMO Wireless Communications; From Real-World Propagation to Space-Time Code Design; 2007.

3GPP TSG RAN1#63, R1-106288 "PUSCH Mode Switching under AGI" Motorola, Jacksonville, USA; Nov. 15-19, 2010, 3 pages.

Japanese Patent Office, "Reasons for Rejection" for Japanese Patent Application No. 2012-503790 dated Oct. 30, 2012, 4 pages.

United States Patent and Trademark Office, "Non-Final Rejection" for U.S. Appl. No. 12/577,105 dated Apr. 9, 2012, 10 pages.

United States Patent and Trademark Office, "Non-Final Rejection" for U.S. Appl. No. 12/577,105 dated Nov. 26, 2012, 11 pages.

Japanese Patent Office, "Decision of Rejection" for Japanese Patent Application No. 2012-503790 dated Jul. 2, 2013, 6 pages.

United States Patent and Trademark Office, "Non-Final Rejection" for U.S. Appl. No. 12/577,105 dated Jul. 15, 2013, 9 pages.

The State Intellectual Property Office of the People's Republic of China Search Report, Sep. 29, 2013, all pages.

European Patent Office, International Search Report and Written Opinion for PCT Application No. PCT/US2010/032153 (related to above-captioned patent application), mailed Aug. 19, 2010.

European Patent Office, Office Action for European Patent Application No. 10715463.5 (related to above-captioned patent application), mailed Jul. 21, 2014.

Pelletier, B. et al., "Comparative Study of Uplink and Downlink Beamforming Algorithms in UTRA/TDD," Proceedings/2004 IEEE 59th Vehicular Technology Conference, VTC 2004-Spring: Towards a Global Wireless World; May 17-19, 2004, Milan, Italy, IEEE Operations Center, Piscataway, NJ, vol. 2, May 17, 2004, pp. 1162-1166.

State Intellectual Property Office of the People's Republic of China, Second Office Action for Chinese Patent Application No. 201080017952.4 (related to above-captioned patent application), mailed Jul. 16, 2014.

State Intellectual Property Office of the People's Republic of China, Third Office Action for Chinese Patent Application No. 201080017952.4 (related to above-captioned patent application), mailed Jan. 28, 2015.

\* cited by examiner

METHOD FOR MULTI-ANTENNA UPLINK TRANSMISSION

FIELD OF THE DISCLOSURE

The present disclosure relates generally to wireless communications and more particularly to transmitting information related to a multi-antenna uplink transmission in an Orthogonal Frequency Division Multiplexed (OFDM) wireless communication system.

BACKGROUND

The Third Generation Partnership Project (3GPP) is developing a Long Term Evolution (LTE) standard using a physical layer based on globally applicable evolved universal terrestrial radio access (E-UTRA). In release-8 specification of LTE, an LTE base station, referred to as an enhanced Node-B (eNB) or base unit, may use an array of four antennas to receive a signal from a piece of user equipment (UE) or wireless terminal. It is envisioned that improved uplink throughput and spectral efficiency may be obtained once a wireless terminal is equipped with multiple antennas that make it possible to use many multi-antenna transmission schemes. Examples of multi-antenna transmission include transmit diversity, open-loop, and closed-loop with single or multiple transmission layers (streams of data). The choice of an optimal transmission scheme depends on characteristics of the uplink channel including signal-to-noise ratio (SNR), channel rank, channel covariance structure, and other characteristics. These quantities vary between users in the system and over the duration of a data session. The uplink scheme may be determined by the eNB that conveys the scheme to the UE via control signaling, as part of the uplink resource allocation information. eNB may base its decision on the uplink channel observed at the eNB. However, there is a need for the UE to assist the decision making based on some measurements of signals received by the multiple antennas at the UE side.

SUMMARY

A method and apparatus for transmitting information based on a relationship between a first channel and a second channel is disclosed. The method can include taking a first channel measurement corresponding to a first antenna of a wireless terminal and taking a second channel measurement corresponding to a second antenna of the wireless terminal. The method can include determining a relationship between the first channel and the second channel based on the first channel measurement and based on the second channel measurement. The method can include transmitting information related to an uplink transmission where the information can be based on the relationship.

DETAILED DESCRIPTION

The embodiments include a method in a wireless terminal. The method can include taking a first channel measurement corresponding to a first antenna of a wireless terminal and taking a second channel measurement corresponding to a second antenna of the wireless terminal. The method can include determining a relationship between the first channel and the second channel based on the first channel measurement and based on the second channel measurement. The method can include transmitting information related to a multi-antenna uplink transmission wherein the information is based on the relationship.

The embodiments further include a method in a base station. The method can include receiving information related to an uplink transmission where the received information can be based on channel measurements made by a wireless terminal and where the channel measurements can correspond to a first antenna of the wireless terminal and a second antenna of the wireless terminal. The method can include selecting a multiple antenna transmission mode for uplink transmission from the wireless terminal based on the received information. The method can include sending an indication of the selected multiple antenna transmission mode to the wireless terminal.

The embodiments further include a wireless terminal. The wireless terminal can include a first antenna, a second antenna, and a transceiver coupled to the first antenna and coupled to the second antenna. The wireless terminal can include a controller coupled to the transceiver, where the controller can be configured to control operations of the wireless terminal. The wireless terminal can include a channel measurement module coupled to the first antenna and coupled to the second antenna, where the channel measurement module can be configured to take a first channel measurement corresponding to the first antenna and configured to take a second channel measurement corresponding to the second antenna. The wireless terminal can include a channel relationship determination module coupled to the controller, where the channel relationship determination module can be configured to determine a relationship between the first channel and the second channel based on the first channel measurement and based on the second channel measurement. The transceiver can be configured to transmit information related to a multi-antenna uplink transmission where the information is based on the relationship.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure comprises a variety of embodiments, such as a method, an apparatus, and an electronic device, and other embodiments that relate to the basic concepts of the disclosure. The electronic device may be any manner of computer, mobile device, or wireless communication device.

Figure 1:
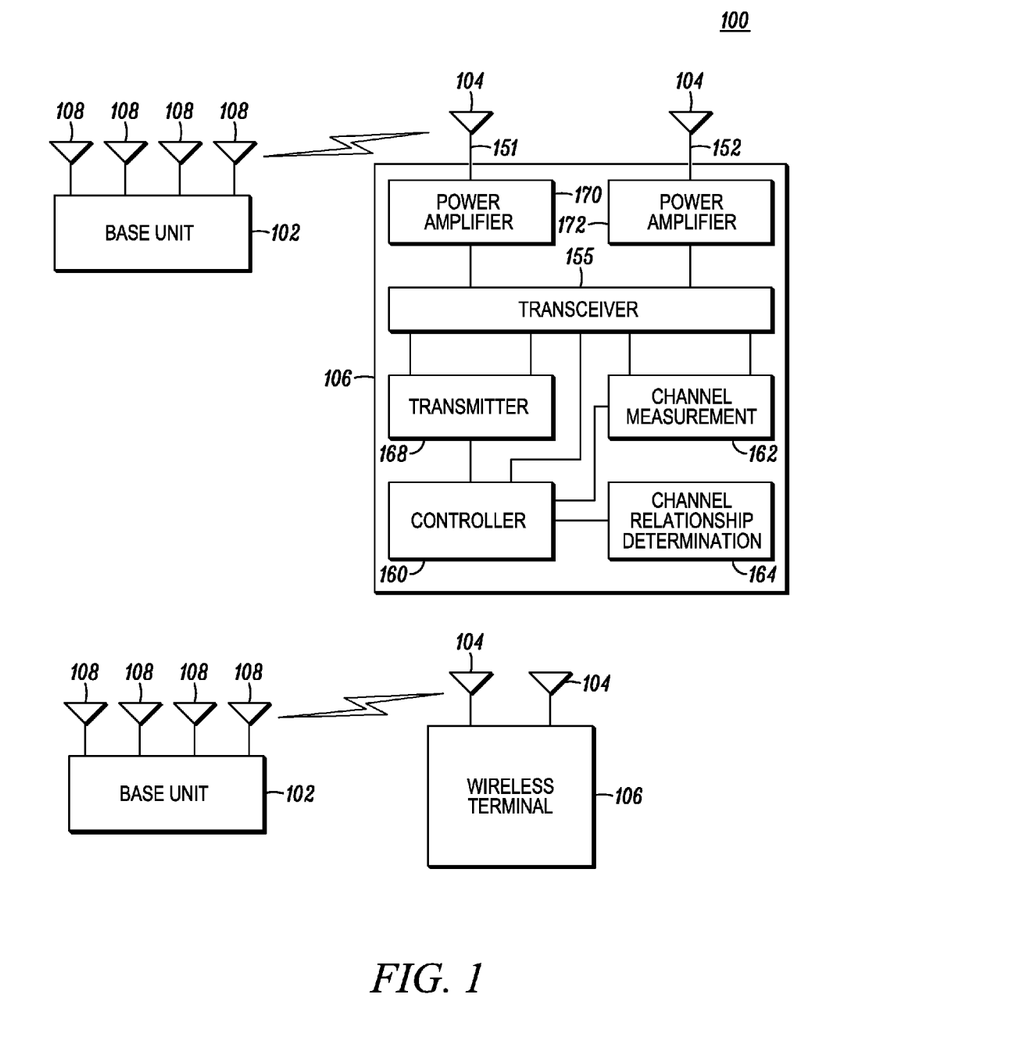
FIG. 1 illustrates a wireless communication system according to a possible embodiment.

In FIG. 1, a wireless communication system 100 can comprise one or more fixed base infrastructure units 102 forming a network distributed over a geographical region for serving wireless terminals 106 in the time and/or frequency domain. A base unit 102 may also be referred to as an access point, access terminal, base, base station, Node-B, eNode-B, Home Node-B, Home eNode-B, relay node, or by other terminology used in the art. The one or more base units 106 each can include one or more antennas 108, each of which may be used for transmission of communication signals, reception of communication signals, or both transmission and reception of communication signals. The base units 102 are generally part of a radio access network that can include one or more controllers communicably coupled to one or more corresponding base units 102. The access network is generally communicably coupled to one or more core networks, which may be coupled to other networks, like the Internet and public switched telephone networks, among other networks. These and other elements of access and core networks are not illustrated but are well known generally by those having ordinary skill in the art.

In FIG. 1, the one or more base units 102 can serve a number of wireless terminals 106, within a corresponding serving area, for example, a cell or a cell sector, via a wireless communication link. The wireless terminals 106 may be fixed or mobile. The wireless terminals 106 may also be referred to as subscriber units, mobiles, mobile stations, users, terminals, subscriber stations, user equipment (UE), user terminals, wireless communication devices, or by other terminology used in the art. In FIG. 1, the base unit 102 transmits downlink communication signals to serve wireless terminal 106 in the time and/or frequency and/or spatial domain. The wireless terminal 106 communicates with base unit 102 via uplink communication signals. The wireless terminal 106 can include one or more antennas 104 each of which may be used for transmission of communication signals, reception of communication signals, or both transmission and reception of communication signals. The wireless terminals 106 may transmit in have half duplex (HD) or full duplex (FD) mode. In Half-duplex transmission and reception do not occur simultaneously whereas in full duplex transmission terminals transmission and reception do occur simultaneously. The wireless terminals 106 may communicate with the base unit 102 via a relay node.

In one implementation, the wireless communication system 100 is compliant with the 3$^{rd}$ Generation Partnership Project (3GPP) Universal Mobile Telecommunications System (UMTS) Long Term Evolution (LTE) protocol, also referred to as Evolved Universal Mobile Telecommunications System (UMTS) Terrestrial Radio Access (EUTRA) or Release-8 (Rel-8) 3GPP LTE or some later generation thereof, wherein the base unit 102 transmits using an orthogonal frequency division multiplexing (OFDM) modulation scheme on the downlink and the user terminals 106 transmit on the uplink using a single carrier frequency division multiple access (SC-FDMA) scheme. More generally, however, the wireless communication system 100 may implement some other open or proprietary communication protocol, for example, WiMAX, among other protocols.

According to one embodiment, the wireless terminal 106 can include a first antenna 151 and a second antenna 152. The wireless terminal 106 can include a transceiver 155 coupled to the first power amplifier 170 and coupled to the second power amplifier 172. The first power amplifier 170 is coupled to the first antenna 151 and the second power amplifier 172 is coupled to the second antenna 152. While a transceiver architecture with one RF front end may be used for antenna switching, another typical architecture may have a transceiver having multiple RF front ends coupled to multiple power amplifiers and the power amplifiers being coupled to multiple antennas. The wireless terminal 106 can include a transmitter 168 coupled to the transceiver 155. The wireless terminal 106 can include a controller 160 coupled to the transceiver 155. The controller 160 can be configured to control operations of the wireless terminal 106. The wireless terminal 106 can include a channel measurement module 162 coupled to the first antenna 151 and coupled to the second antenna 152. The channel measurement module 162 can be configured to take a first channel measurement corresponding to the first antenna 151 and configured to take a second channel measurement corresponding to the second antenna 152. In a typical digital signal processing based implementation, the channel measurement module may be a piece of software (i.e., a DSP module) that performs the function of digital computation. The wireless terminal 106 can include a channel relationship determination module 164 coupled to the controller 160. Again, it could be a DSP module. The channel relationship determination module 164 can be configured to determine a relationship between the first channel and the second channel based on the first channel measurement and based on the second channel measurement. The transceiver 155 can be configured to transmit information related to a multi-antenna uplink transmission wherein the information can be based on the relationship. The channel measurement module 162 and the channel relationship determination module 164 can be coupled to the controller 160, can reside within the controller 160, can reside within memory, can be autonomous modules, can be software, can be hardware, or can be in any other format useful for a module on a wireless terminal 106.

Conventionally a single transceiver with a single RF front end is connected to a single PA which is connected to a single antenna at a wireless terminal in uplink transmission. With multiple physical antennas at the UE, there are different multi-antenna uplink transmission modes. The term transmission mode refers to a particular configuration of elements used in the transmission of a communications signal and their interaction. The uplink transmission modes that can be supported depend on implementation architecture. For example, if the transceiver has a single RF front end but multiple antennas, the UE can transmit from the best antennas adaptively—an operation mode referred to as transmit antenna switching. In the case of a transceiver with multiple front ends coupled to different power amplifiers and different antennas, there are more options for transmission which can be divided into roughly two major categories of schemes: open-loop modes and closed-loop modes. Open-loop modes of operation refer to techniques that do not require the receiver to tell the transmitter any information of the channel experienced in uplink transmission. Closed-loop modes of operation refer to techniques that require the receiver to convey some information about the channel. Based on this information, the transmitter typical weights the signal to be sent on each antenna by a complex-valued coefficient so that, as an example of transmission strategies, maximal amount of signal can be directed to the receiver. This processing is referred to as precoding or beamforming. In both open- or closed-loop modes of operation, the transmitted signals from multiple antennas may correspond to a single stream of data (i.e., single-layer or rank-1) or multiple streams of data (i.e., multi-layer or rank-x).

Figure 2:
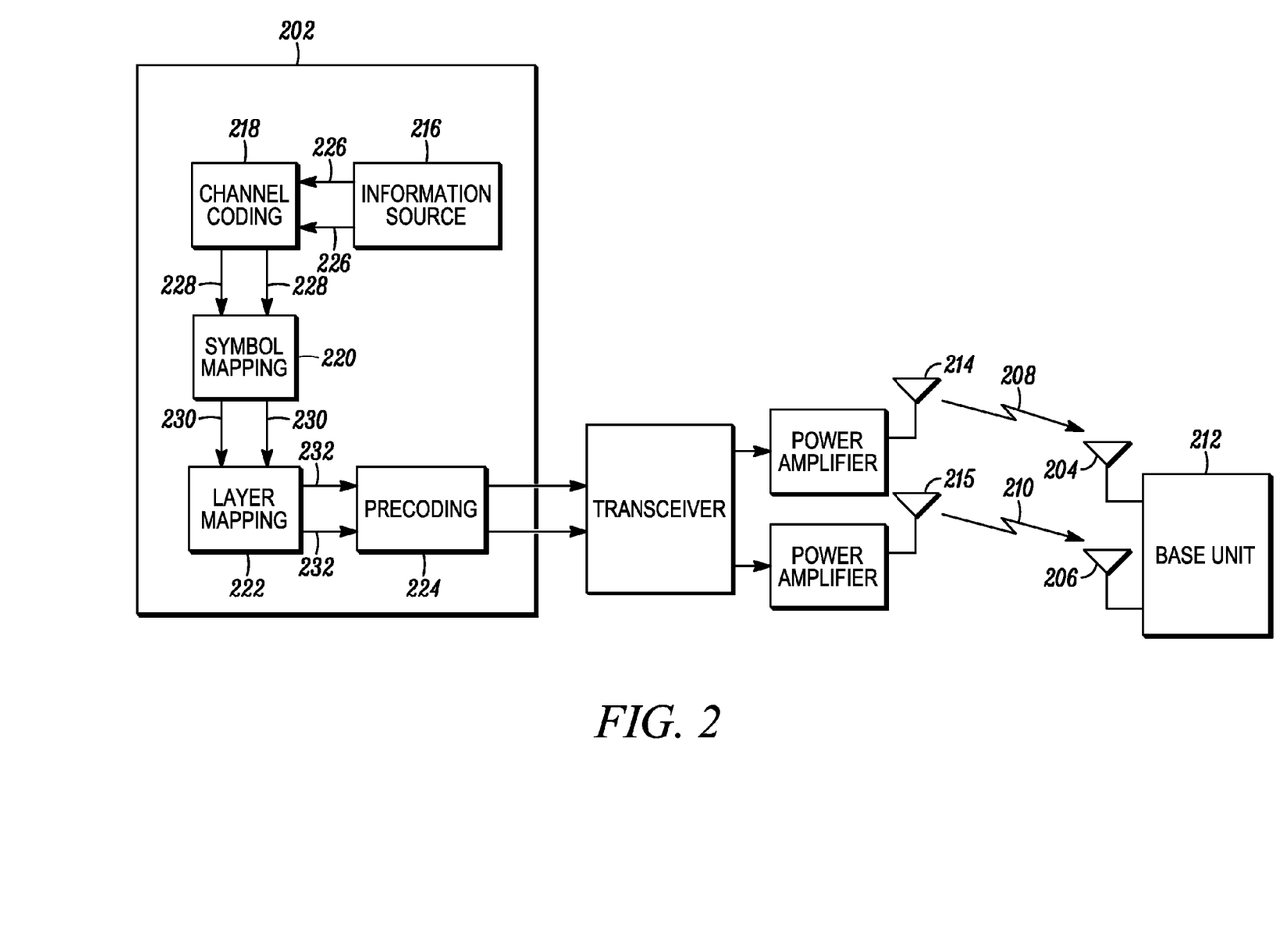
FIG. 2 illustrates a wireless terminal communicating with a base unit according to a possible embodiment.

An example of two-layer closed-loop transmission is shown in FIG. 2 where the transmitter of a wireless terminal' 202 can transmit to a base unit 212 with antennas 214 and 215 from a first uplink channel 208 corresponding to a first antenna 204 of the base unit 212 and through a second uplink channel 210 corresponding to a second antenna 206 of the base unit 212. The uplink communication signal may consist of an information-bearing signal as well as reference signals which may be used by the base unit 212 for determining properties of the uplink channels 208 and 210. The uplink channels 208 and 210 can be represented as vectors with the $i^{th}$ element of the vector representing the channel between the $i^{th}$ transmit antenna at wireless terminal 202 and the antenna at the wireless terminal 202. The channels may be represented in multiple forms. For example, one form is the complex-valued transfer function H(f) as a function of frequency f. Channels 208 and 210 may therefore be represented as a vector of transfer functions:

$$[H_1^{UL}(f) H_2^{UL}(f)]^T$$

The notation $[.]^T$ denotes the transpose of a vector. It is known by those skilled in the art that representations other than the transfer function may be used to describe channels 208 and 210.

In a similar way the downlink channels 234 and 236 from base unit 212 to wireless terminal antennas 214 and 215 may be represented as the vector of transfer functions:

$$[H_1^{DL}(f) H_2^{DL}(f)]^T$$

The terminal 212 can include an information source 216 which generates $N_{TB}$ transport blocks (TBs) 226 containing information to be transmitted to the base unit 212. There may be one TB ($N_{TB}=1$) or up to M TBs with M being the number of antenna at the wireless terminal. Each of the transport blocks 226 can be encoded at a channel coding block 218 separately to form codewords 228 which can include coded bits. Channel coding may be performed with turbo coding, convolutional coding, or block coding. The symbol mapping block 220 can then maps each codeword 228 to a block of complex-valued symbols 230. Symbol mapping can be performed by taking sets of bits from each of the $N_{TB}$ codewords 228 and forming a complex-valued symbol according to a mapping rule. For example the quadrature phase-shift keying (QPSK) mapping rule maps two bits to a complex-valued symbol according to the following table.

| Coded Bits | Complex-valued symbol |
|---|---|
| 00 | 1 + j |
| 01 | −1 + j |
| 10 | −1 − j |
| 11 | 1 − j |

Other mapping rules which map sets of coded bits to quadrature amplitude modulation (QAM) symbols may also be used. The $N_{TB}$ blocks of complex-valued symbols can then be fed to the layer mapping block 222 which can map complex-valued symbols to a set of M layer-mapped output block 232. Note that the layer mapping block 222 can be bypassed in the case of single-layer uplink transmission. The layer-mapped blocks 232 are then fed to the precoding function 224 which can generate the inputs to the M wireless terminal antennas 214 and 215 (for the case of M=2). In a closed-loop mode, precoding 224 can be performed with a precoding matrix which is used to form multiple weighted-combinations of the transmitter outputs. The weighted combinations are then applied to the transmit antennas. Taking $N_{TB}=2$ and M=2 and denoting the $k^{th}$ symbols of the layer-mapped blocks as $s_1(k)$ and $S_2(k)$ and the antenna inputs as $x_1(k)$ and $x_2(k)$, the precoding operation can be written as:

$$\begin{bmatrix} x_1(k) \\ x_2(k) \end{bmatrix} = P \begin{bmatrix} s_1(k) \\ s_2(k) \end{bmatrix}$$

where P is a 2×2 matrix with complex-valued entries. For example, precoding can be described in "MIMO Wireless Communications", Claude Oestges and Brunoi Clerckx, Chapter 8, Academic Press, 2007, Oxford UK), which is hereby incorporated by reference.

In the case of multi-layer uplink transmission for either open- or closed-loop operation, the transmission mode may specify how layer mapping 222 is performed. The layer mapping operation maps $N_{TB}$ blocks of complex-valued symbols to M blocks of complex-valued symbols. This may be done by direct layer mapping where all complex-valued symbols associated with a particular transport block map to the same set of antennas such as with the $N_{TB}=2$, M=2, mapping:

$$s_1(k) = c_1(k)$$

$$s_2(k) = c_2(k)$$

where $c_1(k)$ and $C_2(k)$ are the kth complex-valued symbols exiting the symbol mapping block. corresponding to the first and second transport blocks respectively. As above $s_1(k)$ and $s_2(k)$ are the $k^{th}$ symbols of the layer-mapped blocks corresponding to the first and second antennas. An alternative to direct mapping is mixed layer mapping where complex-valued code symbols corresponding to more than one transport block are mapped to the same layer. An example of layer-mixing with $N_{TB}=2$ and M=2 is the mapping $$s_1(k) = \begin{cases} c_1(k); & k \text{ even} \\ c_2(k); & k \text{ odd} \end{cases}$$

$$s_2(k) = \begin{cases} c_2(k); & k \text{ even} \\ c_1(k); & k \text{ odd}. \end{cases}$$

The uplink transmission mode can also specify the configuration of the reference signals. The reference signal configuration includes such properties of the reference signals as b 1) the pattern of subcarriers that it occupies over a number of symbols, 2) its transmit power or transmit power relative to another signal transmitted by the wireless terminal such as a data signal, 3) the periodicity of transmission, 4) its scrambling pattern. The configuration may apply to reference signals used for demodulation of an uplink data signal or for a reference signal used for demodulation purposes.

The uplink multi-antenna transmission mode, along with the associated transmission parameters, may be determined by the base unit that conveys the selected scheme to the UE via control signaling, typically as part of the uplink resource allocation information. The transmission parameters associated with the selected mode include modulation and coding schemes for each data layer, power to be used for each layer, precoding weights to be used in case of closed-loop operation, antenna to be used in case of antenna switching, and many more. Base unit may base its mode decision and chosen parameters on the uplink channel observed from a reference signal sent by the wireless terminal. The UE may assist the decision making based on some measurements of signals received at the measured characteristics of the multiple antennas at the UE side. This is explained in the following.

Figure 3:
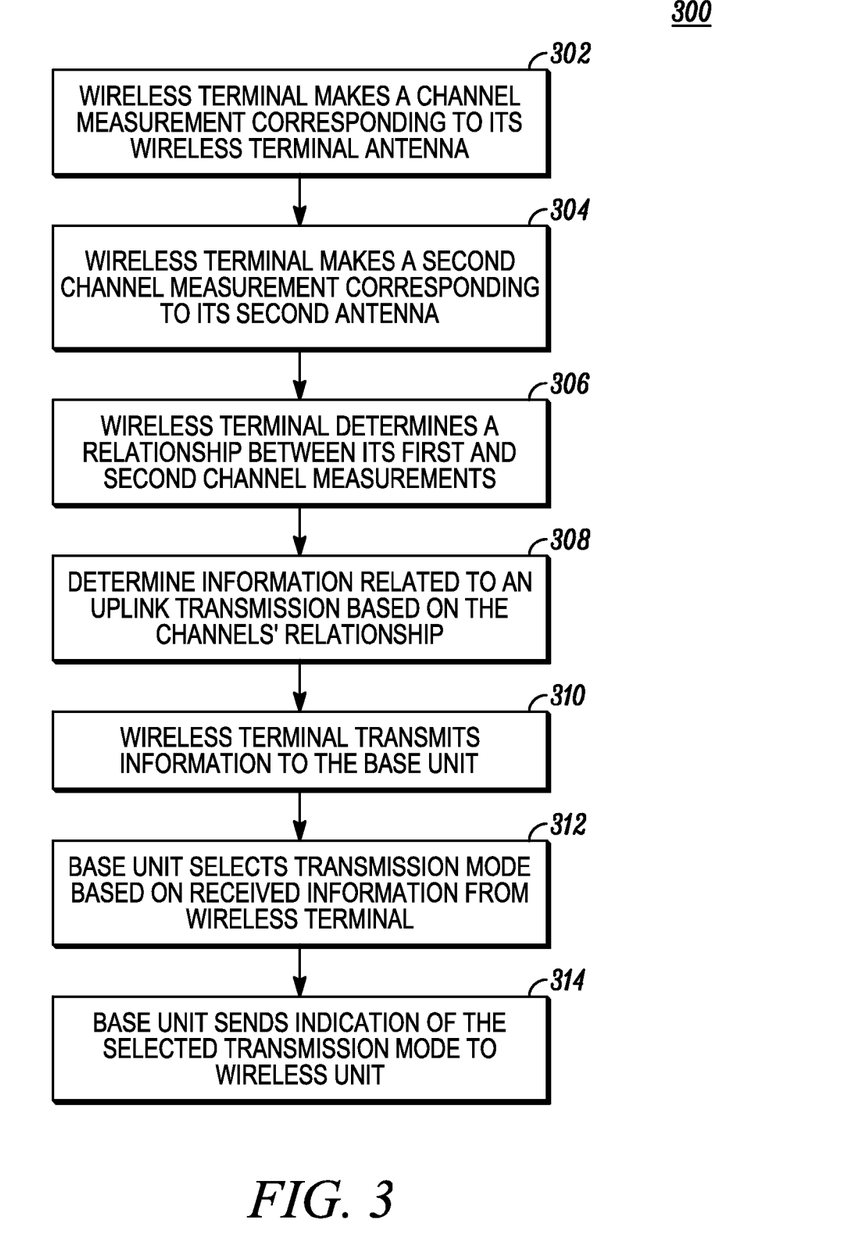
FIG. 3 illustrates a flowchart according to a possible embodiment.

FIG. 3 illustrates a flowchart 300 of operations performed by the wireless unit 202, such as the wireless terminal 106. At 302 and 304, measurements of the channels corresponding to a first and second antenna can be performed. From these measurements, at 306, a relationship between the channels can be calculated. The relationship may, for example, indicate the relative efficiency of transmission by the wireless unit 202 when using its first vs. its second antenna. From the calculated relationship, at 308, the wireless unit 202 can derive information which relates to uplink transmission in the sense that it describes some aspect of multi-antenna uplink transmission. At 310, the wireless unit 202 can transmit this information to the base unit 212. At 312, the base unit 212 can use the received information to select a transmission mode. At 314, the base unit 212 can transmit an indication of the selected transmission mode to the wireless unit 202 on the downlink. The flowchart 300 is explained in more detail according to a related embodiment below.

Considering first the elements 302 and 304 of measuring the first and second channels. These measurements may be performed based on a known reference signal that is transmitted at each of the base unit's transmit antennas 204. In an OFDM system for example, the reference signal transmitted from one of the base unit's antennas 204 may consist of a set of subcarriers whose amplitude and phase are known by the wireless unit 202 and which are transmitted over an OFDM symbol duration. The reference signals are typically repeated with some periodicity in the time domain.

The magnitude and phase of the subcarriers of the received signal can then be compared with the known magnitude and phase of the transmitted signal's subcarriers to yield the transfer function of the channel. With this technique the measured channel is complex-valued and therefore measures the gain and phase shift induced by the channel. Techniques such as filtering and interpolation known in the art may be used to improve measurement accuracy. Measurement of the channel gain may be performed by measuring the received reference signal power relative to the known reference signal transmission power.

Continuing to 306, determining a relationship between the channels can be based on channel measurements. In one embodiment this relationship is the ratio of channel gains of the two channels. Using the transfer function description of channel gain described above, this ratio may be expressed as the Antenna Gain Imbalance (AGI):

$$G = \frac{\sum_{m=1}^{M} \int_{B} |H_{2m}^{DL}(f)|^2 \, df}{\sum_{m=1}^{M} \int_{B} |H_{1m}^{DL}(f)|^2 \, df}$$

where B is a frequency band used for channel measurements. The AGI is a characteristic of an uplink transmission in the sense that it is the ratio of the received powers corresponding to each of the transmit antennas used in the transmissions. The channel gains may optionally be averaged in time before the ratio is taken.

In another embodiment the relationship between the channels calculated by the wireless terminal is the correlation between the channels. Using the representation described above of a channel being a vector of transfer functions, the correlation is the M×M matrix R(f) whose $m_1$ $m_2$ element is given by:

$$R_{m_1 m_2}(f) = E[H_{1m_1}^{DL*}(f) H_{2m_2}^{DL}(f)]$$

where E(.) is the expectation operator over time. The correlation relationship can also be defined as an average correlation over a frequency band:

$$R_{m_1 m_2}^{avg} = \int_{B} E[H_{1m_1}^{DL*}(f) H_{2m_2}^{DL}(f)] df.$$

In another embodiment the relationship between the channels calculated by the wireless terminal is the difference between the path loss corresponding to the first antenna of the wireless terminal and the path loss corresponding to the second antenna of the wireless terminal.

Continuing to determining information related to an uplink transmission based on the channels' relationship at 308, in one embodiment the information related to a mutil-antenna uplink transmission is the relationship itself between the first channel and the second channel as represented by a certain metric. In another embodiment, the information related to a mutil-antenna uplink transmission is the difference between a first power headroom of the power amplifier associated with the first antenna and a second power headroom of the power amplifier associated with the second antenna. A power headroom is a value that represents the maximum power and the power used for an uplink transmission. It is typically a function of the path loss and may also depend on the uplink modulation and coding scheme. In the case of multi-antenna uplink, it is envisioned that different power amplifiers associated with different transmit antennas may have different power headrooms. When different power headrooms are reported to the base unit 212, either in the form of a difference or independently, the base unit 212 may derive the AGI or the path loss difference from the reports since it knows how much power is supposed to be transmitted from each antenna based on the per-antenna power control states. Power headroom reports may be periodic, as configured by the base unit 212. Power headroom reports may also be triggered when the relationship between two channels changes significantly, for example, by comparing the relationship metric with a predetermined threshold.

In another embodiment, the information related to a mutil-antenna uplink transmission is a preference for which of the antennas at the wireless terminal 202 should be used for a future uplink transmission. The preference is derived by comparing the AGI against a threshold, for example 0 dB, and setting the preference to antenna 2 if the AGI is greater than the threshold and setting the preference to antenna 1 otherwise. In another embodiment the information derived on channel measurements is a preference for a multi-antenna uplink transmission mode.

When multiple antennas are used in a closed-loop mode of operation, the transmission mode may also specify the precoding matrix used by the wireless terminal 202 P. The precoding matrix at the wireless terminal 202 is chosen based on an indication from the base unit 212 on which precoding matrix would maximize some metric of the communications link between wireless terminal 202 and base unit 212. For example the metric may be throughput, number of bits conveyed per second, or by signal-to-noise ratio at the base unit 212. The indication from the base unit 212 on which precoding matrix to use can take the form of an index from a set of precoding matrices. For example, the set of precoding matrices for two antenna transmission could be the set (2-layer example):

$$\frac{1}{\sqrt{2}} \cdot \begin{bmatrix} 1 & 0 \\ 0 & 1 \end{bmatrix}, \frac{1}{2}\begin{bmatrix} 1 & 1 \\ 1 & -1 \end{bmatrix}, \frac{1}{2}\begin{bmatrix} 1 & 1 \\ j & -j \end{bmatrix}$$

where "j" is the square root of −1. In the uplink case the receiver is the base unit that observes the uplink channel and also instructs the transmission mode and parameters to the terminal. Conveying the precoding matrix in the format of an index may reduce the control signaling overhead.

The base unit 212 may also instruct the terminal to apply the conveyed precoding matrix in a modified way to better take into count AGI. For example the wireless terminal 202 may indicate its measured AGI on the uplink which is then used to modify the codebook instructed by the base unit as follows:

$$D\begin{bmatrix} 1 & 0 \\ 0 & 1 \end{bmatrix}, \frac{1}{2}D\begin{bmatrix} 1 & 1 \\ 1 & -1 \end{bmatrix}, \frac{1}{2}D\begin{bmatrix} 1 & 1 \\ j & -j \end{bmatrix}$$

where D is the diagonal matrix $$D = \frac{1}{\sqrt{1+G}}\begin{bmatrix} 1 & 0 \\ 0 & \sqrt{G} \end{bmatrix}.$$

Note that this is just an example of the modifier D which is generally defined as a function of AGI.

Figure 4:
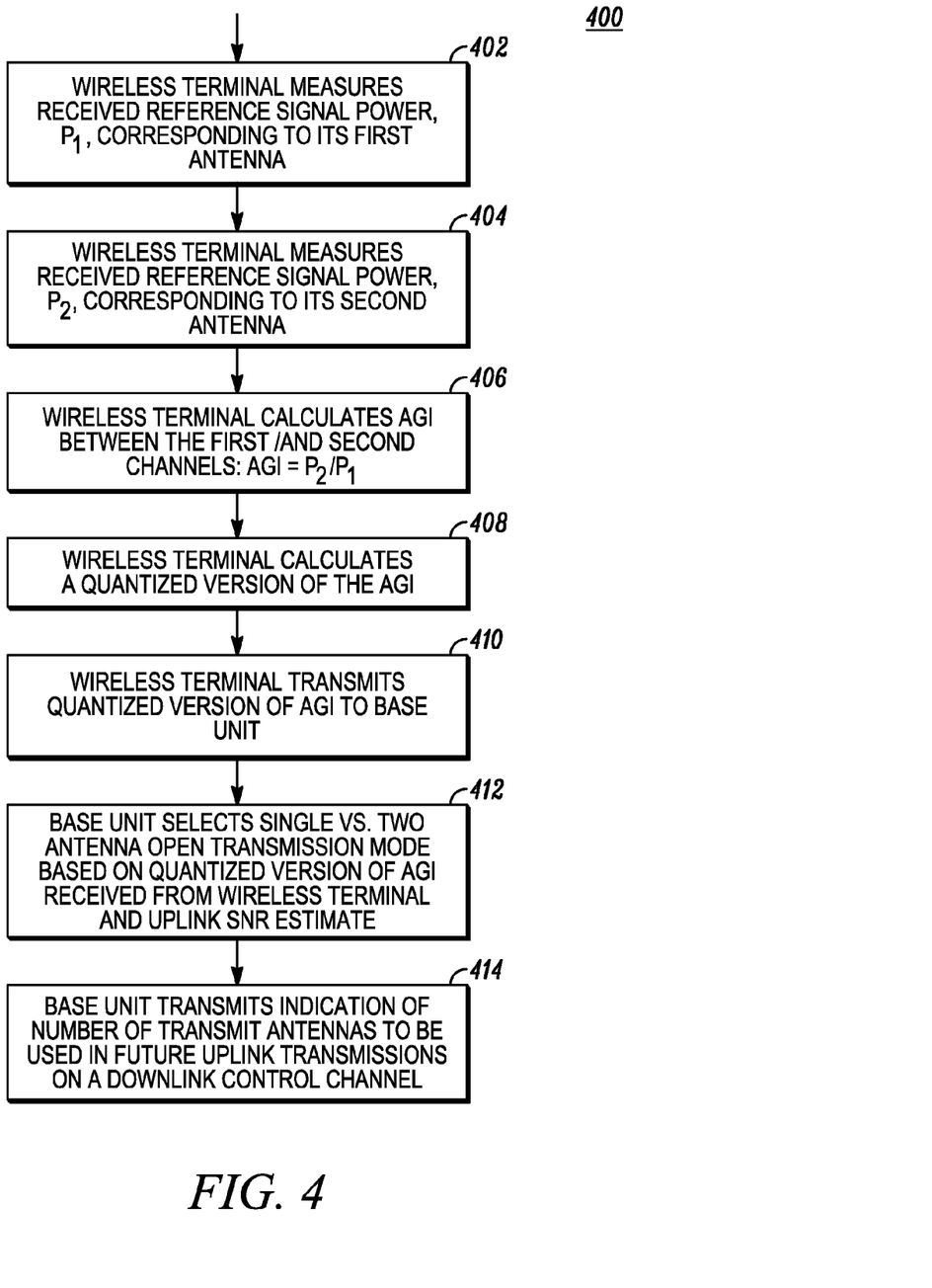
FIG. 4 illustrates a flowchart according to a possible embodiment.

FIG. 4 is an exemplary illustration of a flowchart 400 according to another related and interchangeable embodiment with the flowchart 300. In 402 and 404 the received reference signal powers $P_1$ and $P_2$ can be measured. The AGI, $P_2/P_1$, can be calculated in 406. In 408 the wireless terminal 202 can calculate a quantized version of the AGI. At 410, the wireless terminal 202 can transmit the quantized version of the AGI to the base unit 212. At 412, the base unit 212 can select whether one or two transmit antennas should be used for future uplink transmissions based on the AGI. The determination can also be based on an uplink signal to noise ratio estimate. At 414, the base unit 212 can signal in a downlink control channel an indication of the number of transmit antennas to be used in future uplink transmissions.

Figure 5:
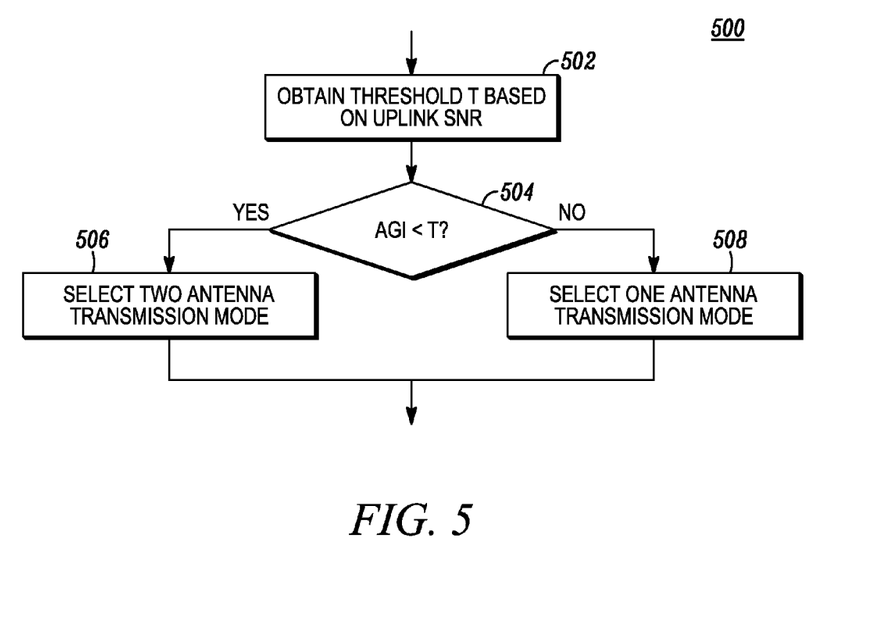
FIG. 5 illustrates an algorithm for a base unit to select between single and two antenna transmission according to a possible embodiment.

FIG. 5 is an exemplary illustration of a flowchart 500 according to another related and interchangeable embodiment with the flowcharts 300 and 400. The flowchart 500 can be used to determine whether to select single or two antenna transmission mode. In 502 a threshold T can be obtained from an estimate of the uplink SNR. As an example, the threshold T can be obtained from a table such as:

| Uplink SNR | T (dB) |
|---|---|
| 11 < SNR < 14 | 1 |
| 14 < SNR < 17 | 2 |
| 17 < SNR < 20 | 3 |
| 20 < SNR < 23 | 4 |
| 23 < SNR < 26 | 5 |
| 26 < SNR < 29 | 6 |

Each row of the table can represent an uplink SNR range where the SNR is expressed in dB. The threshold T for the corresponding SNR is then given by the value in the second column. For example if the SNR was 21 dB, the threshold to be used in 502 can be 4 dB. At 504, the AGI expressed in dB can be compared with the threshold T. In 506, if the AGI is less than the threshold, then two antenna mode can be selected. Otherwise, in 508, a single antenna transmission mode can be selected.

We claim:

1. A method in a wireless terminal, the method comprising:
   taking a first channel measurement corresponding to a first antenna of the wireless terminal;
   calculating a first received reference signal power of the first channel measurement;
   taking a second channel measurement corresponding to a second antenna of the wireless terminal;
   calculating a second received reference signal power of the second channel measurement;
   determining, by the wireless terminal, a quantized version of a power ratio of the second received reference signal power to the first received reference signal power based on the first channel measurement and based on the second channel measurement; and
   transmitting, by the wireless terminal, configuration information derived from the quantized version of the power ratio of the second received reference signal power to the first received reference signal power.

2. The method according to claim 1, wherein the power ratio of the second received reference signal power to the first received reference signal power corresponds to a ratio between a gain of the first channel to a gain of the second channel based on the first channel measurement and based on the second channel measurement.

3. The method according to claim 1, wherein the power ratio of the second received reference signal power to the first received reference signal power corresponds to a ratio between the path loss corresponding to the channel of the first antenna of the wireless terminal and the path loss corresponding to the channel of the second antenna of the wireless terminal.

4. The method according to claim 1, wherein the configuration information comprises the quantized version of the power ratio of the second received reference signal power to the first received reference signal power.

5. The method according to claim 1, wherein the configuration information corresponds to the difference between a first power headroom of the power amplifier associated with the first antenna and a second power headroom of the power amplifier associated with the second antenna.

6. The method according to claim 1, wherein transmitting the configuration information is triggered by comparing the relationship between the first channel and the second channel with a predefined value.

7. The method according to claim 1, wherein the configuration information includes information derived on channel measurements including a preference for a multi-antenna uplink transmission mode selected from a set of transmission modes including at least two of: a single antenna transmission mode, a multi-antenna transmission mode, an open loop transmission mode, a closed loop transmission mode, a direct layer mapping transmission mode, and a mixed layer mapping transmission mode.

8. A method in abuse station, the method comprising:
   receiving configuration information related to a future multi-antenna uplink transmission wherein the received information is based on terminal quantize version of a power ratio of a second received reference signal power to a first received reference signal power, the first received reference signal power based on channel measurements of a first antenna of the wireless terminal and the second received reference signal power based on channel measurements of a second antenna of the wireless terminal;

selecting a multi-antenna transmission mode for uplink transmission from the wireless terminal based on the received configuration information and an uplink signal to noise ratio estimate; and sending an indication of the selected a multi-antenna transmission mode to the wireless terminal in a downlink control channel.

9. The method according to claim 8, wherein the selected multi-antenna transmission mode comprises an instruction of a configuration of a reference signal transmission by the wireless terminal at each antenna.

10. The method according to claim 9, wherein the configuration comprises at least one of properties including pattern, power, and frequency of a reference signal transmission.

11. The method according to claim 8, wherein the selected multi-antenna transmission mode includes a set of possible precoding matrices used by the wireless terminal when transmitting on the first antenna and the second antenna.

12. A wireless terminal comprising:
a first antenna;
a second antenna;
a transceiver coupled to the first antenna and coupled to the second antenna;
a controller coupled to the transceiver, the controller configured to control operations of the wireless terminal;
a channel measurement module coupled to the first antenna and coupled to the second antenna, the channel measurement module configured to determine a first received reference signal power based on a first channel measurement corresponding to the first antenna and configured to determine a second received reference signal power based on a second channel measurement corresponding to the second antenna; and
a power ratio determination module coupled to the controller, the power ratio determination module configured to determine a ratio of the first received reference signal power to the second received reference signal power,
wherein the transceiver is configured to transmit configuration information based on information derived from the quantized version of the power ratio of the second received reference signal power to the first received reference signal power.

13. The wireless terminal according to claim 12, wherein the power ratio of the second received reference signal power to the first received reference signal power corresponds to a ratio between a gain of the first channel corresponding to the first antenna of the wireless terminal and a gain of the second antenna of the wireless terminal.

14. The wireless terminal according to claim 12,
wherein the power ratio of the second received reference signal power to the first received reference signal power corresponds to a ratio between a path loss corresponding to the channel of the first antenna of the wireless terminal and a path loss corresponding to the channel of the second antenna of the wireless terminal.

\* \* \* \* \*